US010187144B2

(12) United States Patent
Prakash et al.

(10) Patent No.: US 10,187,144 B2
(45) Date of Patent: Jan. 22, 2019

(54) MULTI-LAYER NETWORK RESILIENCY SYSTEMS AND METHODS

(71) Applicant: Ciena Corporation, Hanover, MD (US)

(72) Inventors: Anurag Prakash, Noida (IN);
Alexander G. Young, Ottawa (CA);
Mohit Chhillar, Pitam Pura (IN)

(73) Assignee: Ciena Corporation, Hanover, MD (US)

( * ) Notice: Subject to any disclaimer, the term of this patent is extended or adjusted under 35 U.S.C. 154(b) by 0 days.

(21) Appl. No.: 15/669,205

(22) Filed: Aug. 4, 2017

(65) Prior Publication Data

US 2017/0359118 A1 Dec. 14, 2017

Related U.S. Application Data

(63) Continuation of application No. 14/945,806, filed on Nov. 19, 2015, now Pat. No. 9,755,737.

(30) Foreign Application Priority Data

Oct. 8, 2015 (IN) .............................. 3229/DEL/2015

(51) Int. Cl.
*H04B 10/27* (2013.01)
*H04B 10/079* (2013.01)
*H04J 14/08* (2006.01)
*H04L 12/24* (2006.01)
*H04L 12/28* (2006.01)
*H04L 12/46* (2006.01)

(52) U.S. Cl.
CPC ..... *H04B 10/0793* (2013.01); *H04B 10/0791* (2013.01); *H04B 10/27* (2013.01); *H04J 14/08* (2013.01); *H04L 12/28* (2013.01); *H04L 12/462* (2013.01); *H04L 41/0663* (2013.01); *H04L 41/12* (2013.01)

(58) Field of Classification Search
CPC . H04B 10/0793; H04B 10/0791; H04B 10/27
See application file for complete search history.

(56) References Cited

U.S. PATENT DOCUMENTS 6,310,883 B1 * 10/2001 Mann ...................... H04L 45/12
370/408
7,693,074 B2 4/2010 Yasukawa et al.
(Continued)

OTHER PUBLICATIONS

Ceccarelli, "Traffic Engineering Extensions to OSPF for Generalized MPLS (GMPLS) Control of Evolving G.709 OTN Networks draft-ietf-ccamp-gmpls-ospf-g709v3-13", CCAMP Working Group, Dec. 11, 2013, pp. 1-35.
(Continued)

*Primary Examiner* — Dzung Tran
(74) *Attorney, Agent, or Firm* — Clements Bernard Walker PLLC; Christopher L. Bernard; Lawrence A. Baratta, Jr.

(57) ABSTRACT

Systems and methods for path computation of a service in a multi-layer network including a client layer and a server layer include determining correlations between the client layer and the server layer; assigning data to one of client layer links and server layer links based on diversity between one another responsive to the determined correlations; and determining a resiliency path for a service from a current path using the data to determine diversity between the resiliency path and the current path in the client layer and the server layer.

17 Claims, 13 Drawing Sheets

(56) References Cited

U.S. PATENT DOCUMENTS

| | | |
|---|---|---|
| 7,719,957 B2 | 5/2010 | Raahemi et al. |
| 8,666,247 B2 | 3/2014 | Srinivasan et al. |
| 8,682,160 B2 | 3/2014 | Prakash et al. |
| 8,718,471 B2 | 5/2014 | Prakash et al. |
| 8,818,198 B2 | 8/2014 | Trnkus et al. |
| 8,854,955 B2 | 10/2014 | Prakash et al. |
| 2002/0100007 A1 | 7/2002 | Teig et al. |
| 2007/0047556 A1* | 3/2007 | Raahemi ............... H04L 12/18 370/395.53 |
| 2011/0158128 A1* | 6/2011 | Bejerano ............ H04L 12/1877 370/256 |
| 2013/0177305 A1 | 7/2013 | Prakash et al. |
| 2013/0308943 A1 | 11/2013 | Young et al. |
| 2013/0308948 A1 | 11/2013 | Swinkels et al. |
| 2014/0205278 A1 | 7/2014 | Kakkar et al. |
| 2015/0063802 A1* | 3/2015 | Bahadur ............... H04L 47/125 398/49 |
| 2017/0012871 A1* | 1/2017 | Iovanna ................. H04L 45/64 |

OTHER PUBLICATIONS

Mannie, "Generalized Multi-Protocol Label Switching (GMPLS) Architecture", Network Working Group, Oct. 2004, pp. 1-69.

"Distributed Call and Connection Management: Signalling mechanism using GMPLS RSVP-TE", International Telecommunication Union, Mar. 2003, pp. 1-46.

"Architecture for the automatically switched optical network", International Telecommunication Union, Feb. 2012, pp. 1-124.

\* cited by examiner

MULTI-LAYER NETWORK RESILIENCY SYSTEMS AND METHODS

CROSS-REFERENCE TO RELATED APPLICATION(S)

The present patent application/patent is a continuation of U.S. patent application Ser. No. 14/945,806, filed on Nov. 19, 2015, and entitled "MULTI-LAYER NETWORK RESILIENCY SYSTEMS AND METHODS," which claims the benefit of priority of Indian Patent Application No. 3229/DEL/2015, filed on Oct. 8, 2015, and entitled "MULTI-LAYER NETWORK RESILIENCY SYSTEMS AND METHODS," the contents of each is incorporated in full by reference herein.

FIELD OF THE DISCLOSURE

The present disclosure generally relates to networking systems and methods. More particularly, the present disclosure relates to multi-layer network resiliency systems and methods which optimize a client layer given a server layer (or vice versa).

BACKGROUND OF THE DISCLOSURE

Networks are multi-layered in nature, such as abstracted by the Open Systems Interconnection model of Layers 1 through 7 (L1-L7). For descriptions herein, an additional Layer 0 is described as the physical photonic/Dense Wavelength Division Multiplexing (DWDM) network, whereas Layer 1 is used for Optical Transport Network (OTN) or other Time Division Multiplexing (TDM) protocols. For example, with optical networks, a circuit switching layer (L1) (e.g., OTN, Synchronous Optical Network (SONET), etc.) relies on underlying DWDM (L0) with various Reconfigurable Optical Add/Drop Multiplexers (ROADMs). Above the circuit switching layer, packet connectivity such as Ethernet, Internet Protocol (IP), etc. can add to the network hierarchy, e.g., L2+. In this hierarchy, a server layer is typically responsible for physical connectivity, and a client layer is responsible for fast reroutes, flow control, Quality of Service (QoS), etc. For example, DWDM can be the server layer whereas OTN is the client layer.

One problem with this model is that multiple links in the client layer could be physically co-routed in the underlying server layer. Thus, a single failure in the server layer could lead to multiple failures in the client layer. The operational costs associated with protection bandwidth provisioning in a multi-layer architecture impacts network economics. Existing L1 network overlay design is a manual process whereby resiliency is achieved by trying to lay down L1 links over L0 paths to maximize resiliency. This process becomes complicated as the L0/1 network complexity increases. The result can be an ad-hoc network design that has non-optimal resiliency capability given the cost of the network—that is to say for the same amount of equipment a higher level of resiliency is achievable. Existing L0 network control plane functions resolve failures without any consideration for the overlay network. The result of this is a steady erosion of the resiliency that was originally designed into the network through non-optimal restoration path selection, possibly leading to partitioning of the client layer given failures in the server layer.

It would be advantageous to optimize a client layer given a server layer (or vice versa, i.e., optimize the server layer given the client layer).

BRIEF SUMMARY OF THE DISCLOSURE

In an exemplary embodiment, a method of providing resiliency between a server layer and a client layer includes determining a minimal spanning tree in the client layer; determining a Steiner tree in the server layer based on vertices associated with the minimal spanning tree in the client layer; and determining one or more resiliency paths in the client layer based on the minimal spanning tree and the Steiner tree, wherein the one or more resiliency paths are added to the minimal spanning tree in the client layer based on potential failures in the Steiner tree. The determining one or more resiliency paths can include reviewing an impact of a failure on each link in the Steiner tree on links in the minimal spanning tree; and adjusting the minimal spanning tree in the client layer based on the impact. The determining one or more resiliency paths can include adding the one or more resiliency paths as additional links in the client layer to the minimal spanning tree based on the potential failures in the Steiner tree to avoid partitioning in the client layer based on the potential failures. The method can include routing the additional links in the server layer based on exclusion list criterion. The method can further include, responsive to assigning tags to links in the client layer, assigning the tags to the server layer; and utilizing the tags in the server layer during redial activity to maintain maximal diversity. The server layer can be an optical layer and the client layer can be a Time Division Multiplexing layer. The server layer can be an optical layer and the client layer can utilize Optical Transport Network.

In another exemplary embodiment, a controller configured to provide resiliency between a server layer and a client layer includes a processor; and memory storing instructions that, when executed, cause the processor to determine a minimal spanning tree in the client layer, determine a Steiner tree in the server layer based on vertices associated with the minimal spanning tree in the client layer, and determine one or more resiliency paths in the client layer based on the minimal spanning tree and the Steiner tree, wherein the one or more resiliency paths are added to the minimal spanning tree in the client layer based on potential failures in the Steiner tree. To determine one or more resiliency paths, the memory storing instructions that, when executed, further cause the processor to review an impact of a failure on each link in the Steiner tree on links in the minimal spanning tree, and adjust the minimal spanning tree in the client layer based on the impact. To determine one or more resiliency paths, the memory storing instructions that, when executed, further cause the processor to add the one or more resiliency paths as additional links in the client layer to the minimal spanning tree based on the potential failures in the Steiner tree to avoid partitioning in the client layer based on the potential failures. The memory storing instructions that, when executed, can further cause the processor to route the additional links in the server layer based on exclusion list criterion. The memory storing instructions that, when executed, can further cause the processor to, responsive to assigning tags to links in the client layer, assigning the tags to the server layer; and utilizing the tags in the server layer during redial activity to maintain maximal diversity. The server layer can be an optical layer and the client layer can be a Time Division Multiplexing layer. The server layer can be an optical layer and the client layer can utilize Optical Transport Network.

In a further exemplary embodiment, a multi-layer network includes a client layer; a server layer configured to transport the client layer; and a controller configured to determine a minimal spanning tree in the client layer, determine a Steiner tree in the server layer based on vertices associated with the minimal spanning tree in the client layer, and determine one or more resiliency paths in the client layer based on the minimal spanning tree and the Steiner tree, wherein the one or more resiliency paths are added to the minimal spanning tree in the client layer based on potential failures in the Steiner tree. To determine one or more resiliency paths, the controller can be configured to review an impact of a failure on each link in the Steiner tree on links in the minimal spanning tree, and adjust the minimal spanning tree in the client layer based on the impact. To determine one or more resiliency paths, the controller can be configured to add the one or more resiliency paths as additional links in the client layer to the minimal spanning tree based on the potential failures in the Steiner tree to avoid partitioning in the client layer based on the potential failures. The controller can be further configured to route the additional links in the server layer based on exclusion list criterion. The controller can be further configured to, responsive to assigning tags to links in the client layer, assigning the tags to the server layer; and utilizing the tags in the server layer during redial activity to maintain maximal diversity. The server layer can be an optical layer and the client layer can be a Time Division Multiplexing layer.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

In various exemplary embodiments, the present disclosure relates to multi-layer network resiliency systems and methods. In an exemplary embodiment, the systems and methods optimize overlay network resiliency given a server layer network and a set of client layer network nodes. The optimized client layer overlay reduces the probability of a server layer failure resulting in the partitioning of the client layer network. Further, the systems and methods ensure that client layer design parameters are taken into account when server layer paths are being restored. This means that in the event of a server layer failure, the server layer control plane or Software Defined Networking (SDN) controller will select restoration paths that maximally preserve the resiliency of the client overlay network. The client layer network is designed based on a given server layer for single cut resiliency (at a time), to optimize the number of line interfaces and latency in the client layer. The systems and methods can use Minimal Spanning Trees (MST) and Steiner graphs or trees, and the systems and methods can provide exclusion rules for service re-dial in the server layer for mesh restorations.

Advantageously, the systems and methods provide an approach to evaluate and optimize a L1 network layout on the L0 underlay network resulting in predictable resiliency rather than an ad-hoc manual network design process. The combination of MST and Steiner graph analysis to arrive at an optimal layout is novel along with the concept of enabling max diversity rules for redials for the services in the server layer. In another exemplary embodiment, the systems and methods can optimize network resiliency given a client layer network and a set of server layer network nodes, i.e., to help design a green field server layer network given a required client layer topology.

The systems and methods take a top-down approach and can work with control planes, SDN, or the like. Here instead of the server layer directing the bundle ID diversity, the client layer can use Diversity Tags for maintaining single cut (DWDM layer) resiliency in the client layer, i.e. the client layer is never segmented. Existing control planes only consider the demands of their own layer without taking into account that of overlay or underlay networks. In the systems and methods, the control plane operates with knowledge and metrics from the overlay network to guide its restoration path. When there exists no L0 path that is completely disjoint for a restoration path, an exclusion list is a metric used to compare two paths that are not disjoint to determine which one has the least overlap.

Multi-Layer Network

Figure 1:
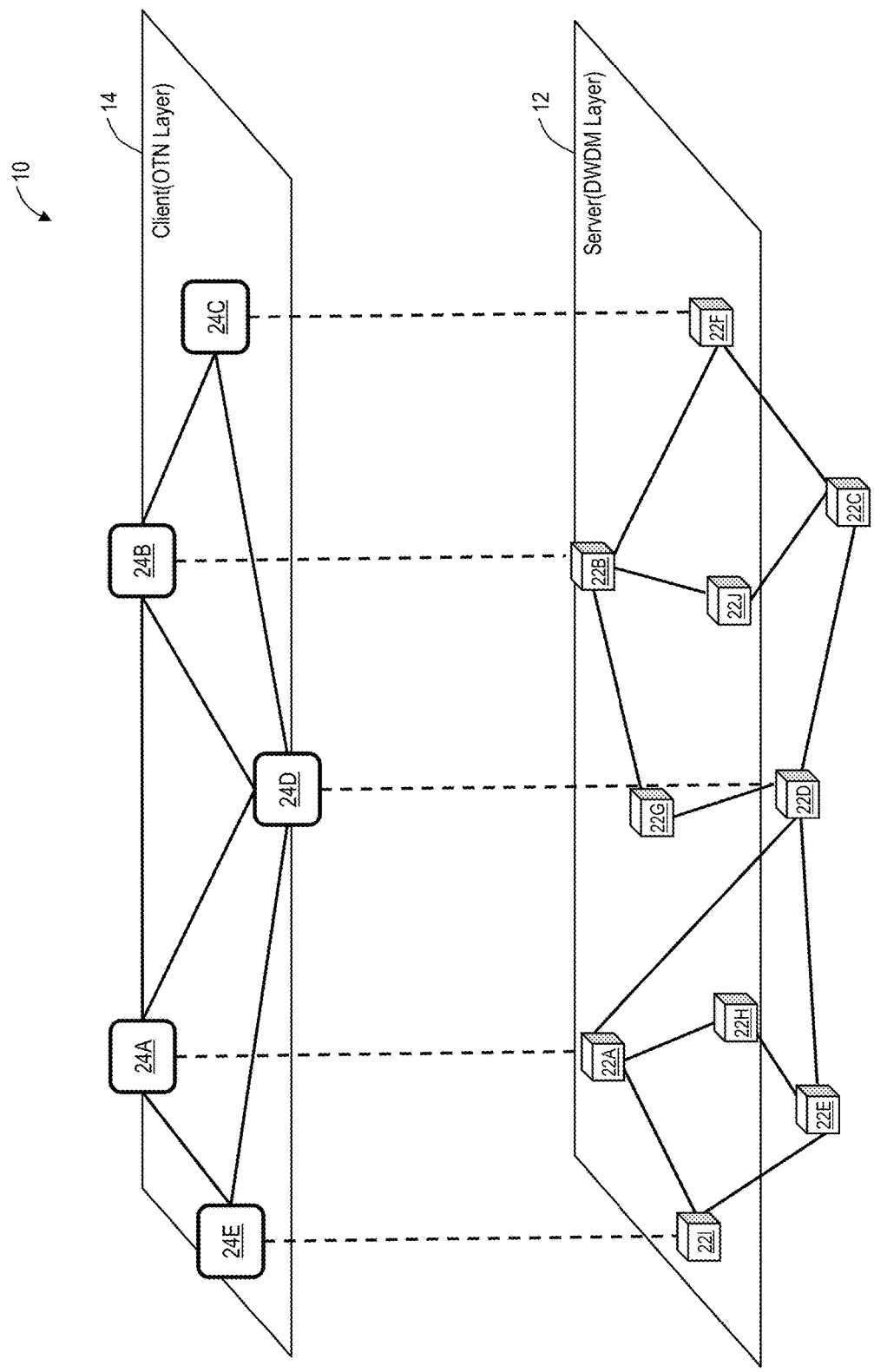
FIG. 1 is a network diagram of a multi-layer network with a server layer and a client layer.
Figure 2:
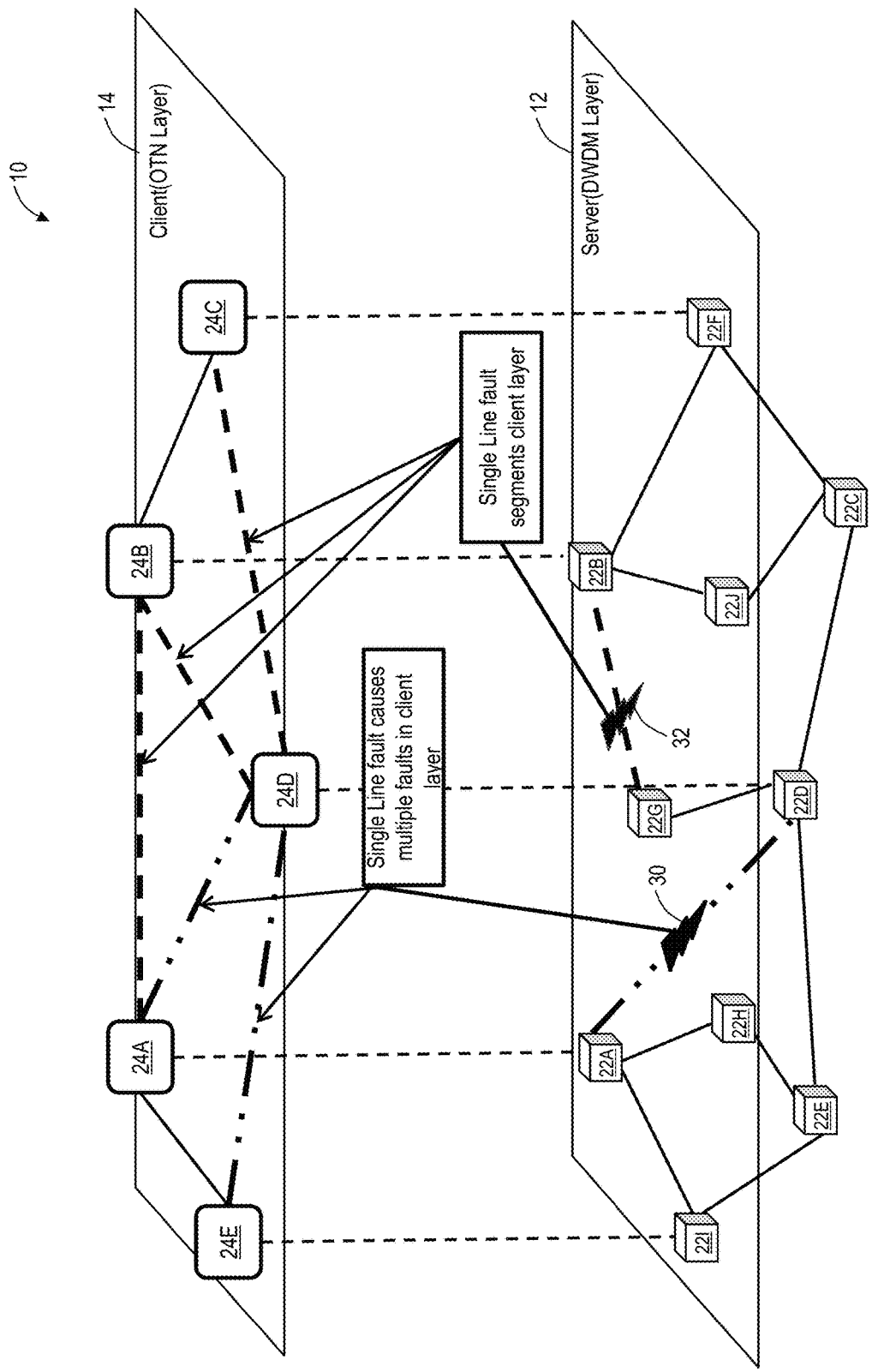
FIG. 2 is a network diagram of the multi-layer network of FIG. 1 illustrating impacts of failures in the server layer on the client layer.

Referring to FIGS. 1 and 2, in an exemplary embodiment, a network diagram illustrates a multi-layer network 10 with a server layer 12 and a client layer 14 (FIG. 1) and impacts of failures in the server layer 12 on the client layer 14 (FIG. 2). For illustration purposes, the server layer 12 can be a DWDM layer and the client layer 14 can be an OTN layer. The foregoing descriptions maintain these examples, but those of ordinary skill in the art will recognize that the layers 12, 14 can be any adjacent protocols in a network. The server layer 12 can be physically implemented by a plurality of optical nodes 22A-22J interconnected to one another by optical fibers and providing wavelength connectivity and wavelength switching. For example, the optical nodes 22A-22J could be ROADM nodes of varying degrees. The client layer 14 can be physically implemented via switches 24A-24E interconnect to one another via wavelengths and providing TDM connectivity and TDM switching. In an exemplary embodiment, the TDM protocol can be OTN.

Note, there is a different topology between the layers 12, 14. For example, the client layer 14 has a set of switches 24 that is smaller than the set of optical nodes 22 in the server layer 12. For example, the server layer 12 has an optical node 22H, but the client layer 14 does not have a corresponding switch located at this site. In the server layer 12, the optical node 22H is configured for wavelength bypass or express connectivity. Again, as described herein, services in the client layer 14 are routed without necessarily considering resiliency in the underlying server layer 12. FIG. 2 illustrates the exemplary impact of faults 30, 32 in the server layer 12 on the client layer 14. A fault 30 between the nodes 22A, 22D in the server layer 12 is shown to cause two faults in the client layer 14, i.e., breaking connectivity between the switches 24A, 24D and the switches 24D, 24E. A fault 32 between the nodes 22B, 22G in the server layer 12 is shown to cause three faults in the client layer 14, i.e., breaking connectivity between the switches 24A, 24B, the switches 24B, 24D, and the switches 24C, 24D.

Again, in the multi-layer network 10, resiliency depends on the overlay of the client layer 14 on the server layer 12, and, for example, these are OTN and DWDM networks respectively. In operation, the two layers 12, 14 can operate in two general manners—an overlay model which can be thought of as distributed and an SDN model which can be thought of as centralized. Of course, actual deployments could use a combination of these models in a hybrid approach. In the overlay model, such as using a distributed control plane, independent operations in the server layer 12 and the client layer 14 occur without any exchange of information between the two layers 12, 14. This can lead to sympathetic faults as well to multiple topology failures in the client layer 14 due to a single fault in the server layer 12, as shown in FIG. 2. To prevent these drawbacks, manual provisioning of Shared Risk Link Groups (SRLG) as physical bundle identifiers (IDs) may be employed. These measures are not effective if a server layer control plane that has no client layer network knowledge is involved.

In the SDN model, the server layer 12 and the client layer 14 are integrated by SDN and/or a global Path Computation Engine (PCE) and hence a correlation mechanism can be managed by the same. However, there needs to be a mechanism to compute and enforce routing restrictions in the layers 12, 14, to allow for resiliency. In either of the above-mentioned models, the network design and routing (control plane or SDN-enabled) problem can be formulated based on the following: 1) what is the optimized client layer 14 network topology needed to survive a single line/bundle fault in the server layer 12? Here survival means none of the switches 24 is isolated from the network 10, i.e., no segmented or partitioned network; 2) what routes should each of the client layer 14 links be assigned so as to achieve 1)?; 3) what server layer 12 diversity (exclusion lists) rules should be assigned to this client layer 14 links when re-routing or re-dialing them in the server layer 12?; 4) is it possible to identify the switches 24 in the client layer 14 which cannot be protected against which single line fault in the server layer 12?; 5) can the reverse problem of designing the server layer 12 network based on client layer 14 knowledge also be solved in a similar fashion? The systems and methods described herein provide a novel approach to address the aforementioned.

Multi-Layer Resiliency Process

Referring to FIGS. 3-8, in various exemplary embodiments, network diagrams and a flowchart illustrates a multi-layer resiliency process 50. Again, for illustration purposes, the server layer 12 is shown as DWDM and the client layer 14 is shown as OTN. In this example of the multi-layer resiliency process 50, the server layer 12 is a given, i.e., the locations of the nodes 22A-22I are fixed. The client layer 14 desires to have connectivity between the switches 24A-24E, and the number of the switches 24 is less than the number of the nodes 22. For implementing the multi-layer resiliency process 50, the connectivity assumption in the client layer 14 is a full mesh topology meaning any switch 24 can directly reach any other switch 24.

Multi-Layer Resiliency Process—Phase 1: Minimal Tree Correlation Across Layers

Figure 3:
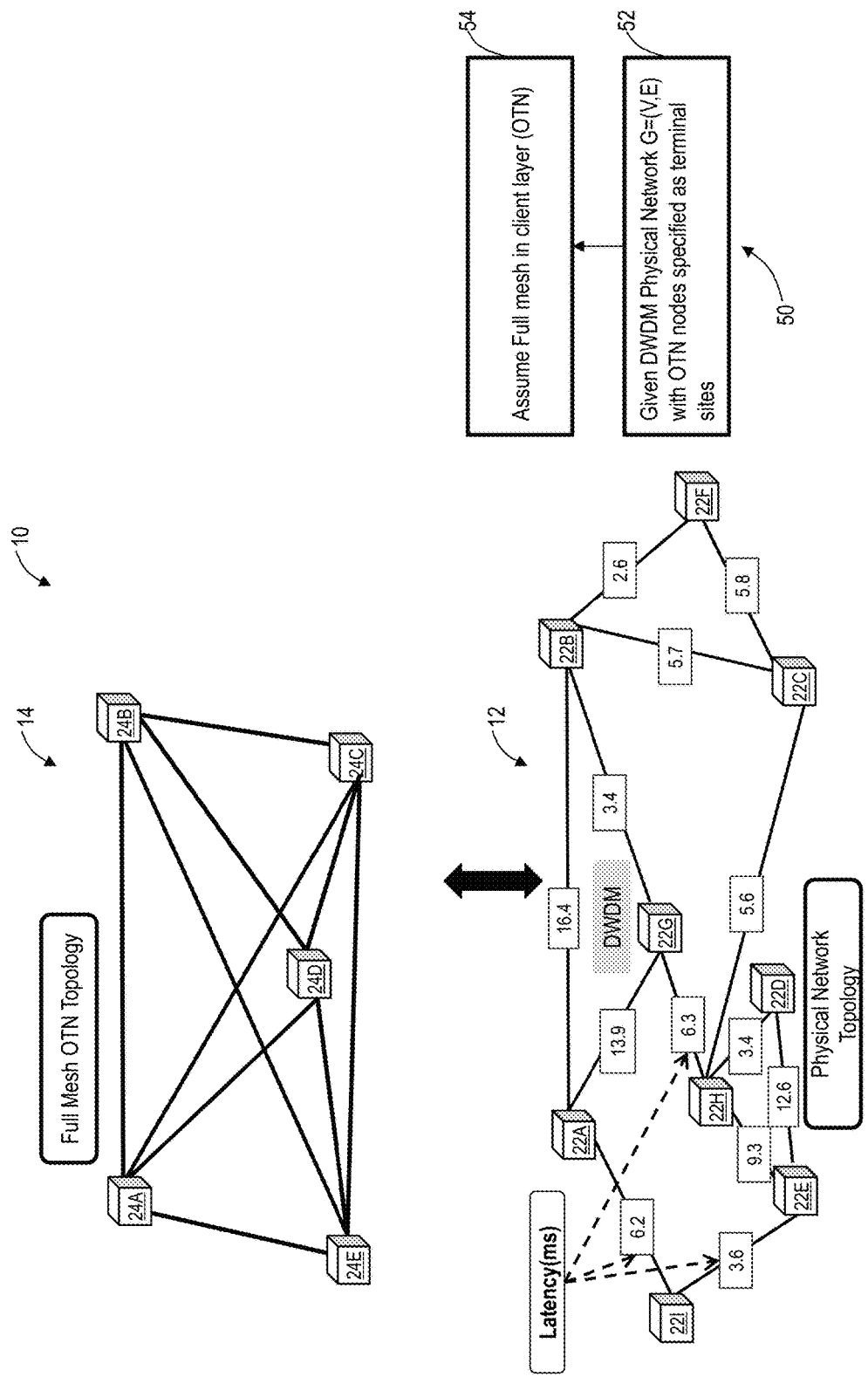
FIGS. 3 and 4 are network diagrams of a network and flowcharts of a multi-layer resiliency process illustrating minimal tree correlation across client and server layers.

First, the multi-layer resiliency process 50 seeks to address minimal tree correlation between the layers 12, 14. In FIG. 3, the network 10 is shown for illustrating the multi-layer resiliency process 50. The multi-layer resiliency process 50 starts with a given DWDM Physical Network G=(V, E) with OTN nodes specified as terminal sites (step 52). Here, the physical DWDM network, i.e., the server layer 12, can be a graph, G, with associated vertices, V, and edges, E. The vertices, V, can be locations of the switches 24. The multi-layer resiliency process 50 assumes a full mesh in the client layer 14 to start (step 54). Each of the links in the server layer 12 has an associated latency, e.g., in milliseconds. These latencies are shown in FIG. 3 on the server layer 12. Note, latency is one exemplary Figure of Merit for assigning costs or weights to the links in the server layer 12. Other Figure of Merits may also be used.

Figure 4:
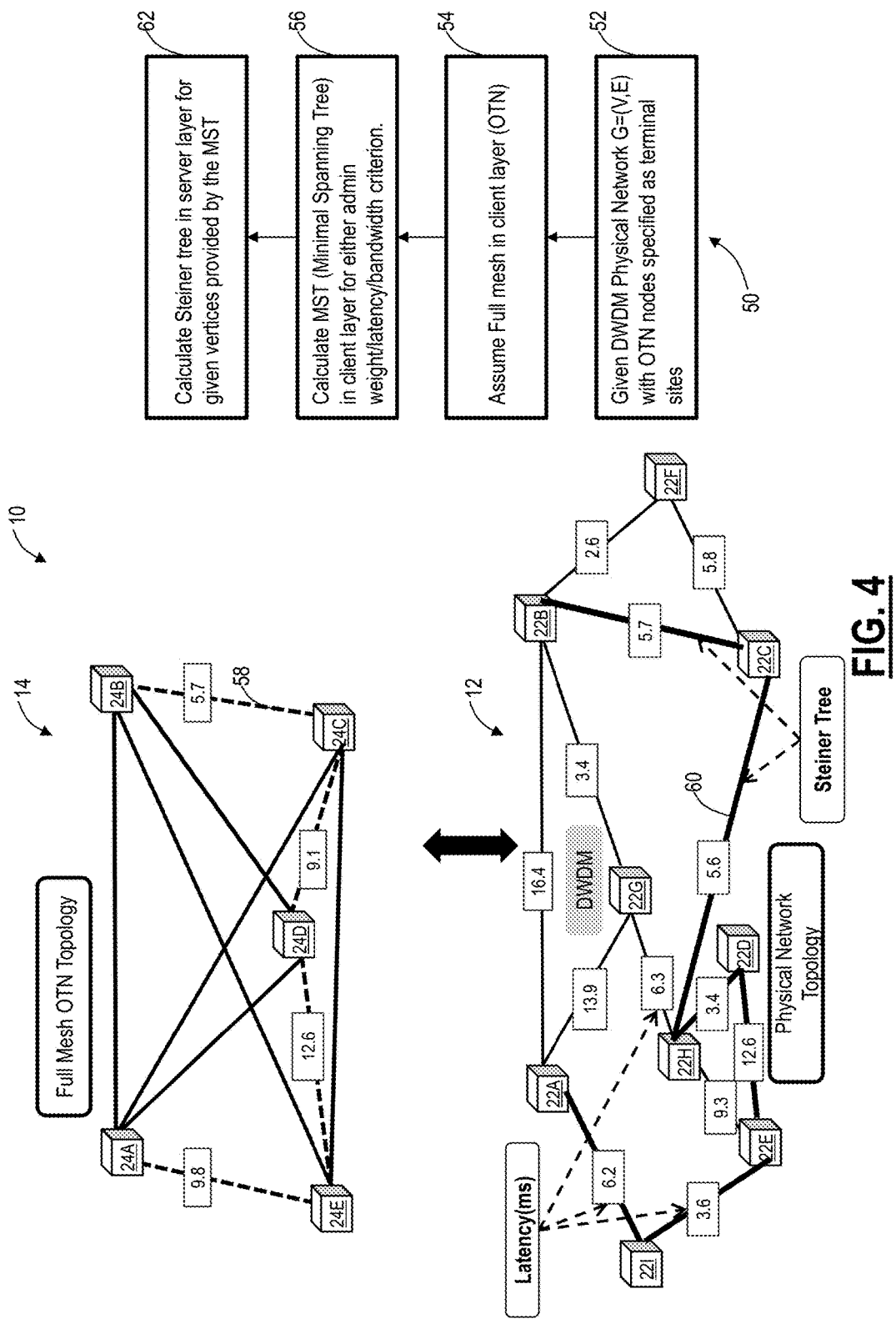

The multi-layer resiliency process 50 can be implemented in the design of the network 10, and here, an assumption is made because connectivity is not known in the client layer 14. This assumption ensures the client layer 14 is designed with resiliency relative to the server layer 12. In FIG. 4, the multi-layer resiliency process 50 includes calculating a Minimal Spanning Tree (MST) in the client layer 14 (OTN layer), using administrative weight, latency, or bandwidth criterion (step 56). For example, an MST 58 is illustrated in FIG. 4 using latency values in the server layer 12 as the routing criteria. Next, the multi-layer resiliency process 50 includes calculating a Steiner tree 60 in the server layer 12 for given vertices (i.e., the switches 24A, 24B, 24C, 24D, 24E) provided by the MST (step 62).

Note, there are various techniques for calculating the Steiner tree 60, and the systems and methods contemplate using any of these techniques. The Steiner tree problem is superficially similar to the minimum spanning tree problem: given a set V of points (vertices), interconnect them by a network (graph) of shortest length, where the length is the sum of the lengths of all edges. The difference between the Steiner tree problem and the minimum spanning tree problem is that, in the Steiner tree problem, extra intermediate vertices and edges may be added to the graph in order to reduce the length of the spanning tree. In the systems and methods, the set V of points is defined by the switch 24 locations in the client layer 14. The Steiner tree 60 can be calculated based on either administrative weight, latency, or bandwidth criterion. The result from phase 1 of the multi-layer resiliency process 50 is the Steiner tree 60 in the server layer 12 and the MST 58 in the client layer 14. Generally, the multi-layer resiliency process 50 has an objective of adding links (so-called resiliency paths) in the MST 58 based on potential failures of links in the Steiner tree 60. Note, without the resiliency paths, a failure in the Steiner tree 60 causes the MST 58 to become partitioned. By adding the resiliency paths, the potential failures in the Steiner tree 60 do not lead to partitioning in the client layer 14.

Multi-Layer Resiliency Process—Phase 2: Steiner Tree Failures

The phase 2 of the multi-layer resiliency process 50 addresses the calculation of the extra resiliency paths in the client layer 14 based on failures in the Steiner tree 60. Specifically, the systems and methods recognize that adding the resiliency paths in the client layer 14 based on failures in the Steiner tree 60 minimizes the chances of partitioning the network 10 at the client layer 14 based on faults in the server layer 12. The systems and methods also help ensure that when faults do occur in the server layer 12, the underlying restoration in the server layer 12 is done to continue to preserve resiliency in the client layer 14. This aspect is addressed by the phase 2.

The phase 2 of the multi-layer resiliency process 50 includes a simulation of failing each link in the Steiner tree (step 70). This step 70 is to determine the effect of a failure in the server layer 12 on the client layer 14. First, in the example of FIG. 5, the Steiner tree 60 link between the nodes 22E, 22D is simulated as failed, leading to a corresponding failure in the MST 58 between the switches 24D, 24E. Subsequent to the simulated failure in the Steiner tree 60, any associated client layer MST 58 links that also fail based on the simulated failure are assigned a high cost (step 72). The high cost is either set to very high values or a disjoint route cost from the phase 1.

Figure 5:
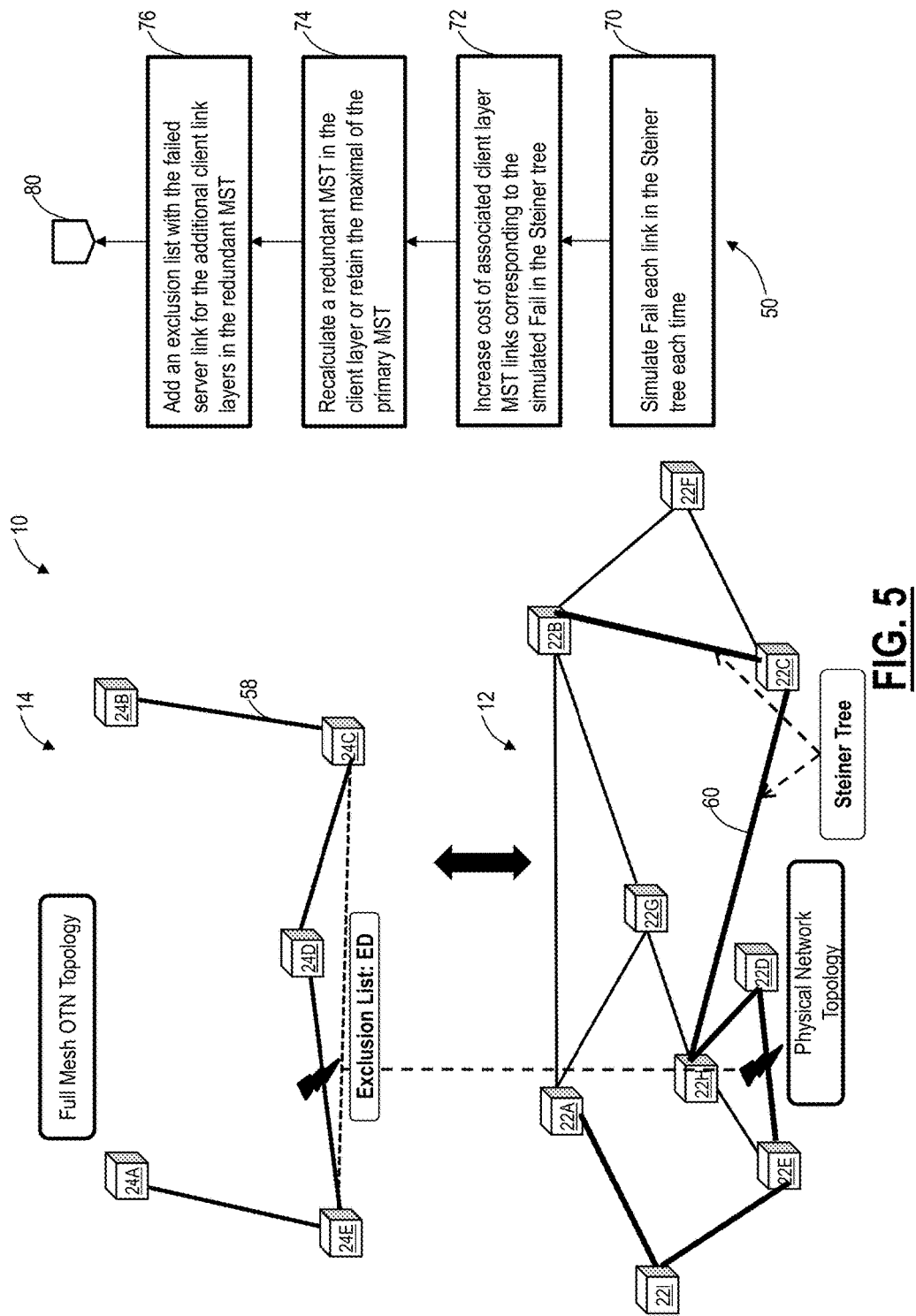
FIG. 5 is a network diagram of a network and flowcharts of the multi-layer resiliency process from FIGS. 3 and 4 illustrating a simulated failure.

With the adjusted costs in the client layer 14, a redundant MST is recalculated in the client layer 14 or the primary MST 58 is retained (step 74). Here, the redundant MST is recalculated based on either administrative weight, latency, or bandwidth criterion, similar to the step 56. In this example, due to the failure in the Steiner tree link between the nodes 22D, 22E, the redundant MST includes an additional client layer link between the switches 24C, 24E. For the additional client layer link, the phase 2 includes adding an exclusion list with the failed server layer link (step 76). The exclusion list is used in the client layer 14 so that routing avoids the associated failed server layer link. In the example of FIG. 5, for the failure in the Steiner tree link between the nodes 22D, 22E, an additional client layer link between the switches 24C, 24E is added in the redundant MST with an exclusion list including the Steiner tree link between the nodes 22D, 22E. The multi-layer resiliency process 50, in FIG. 5, goes to step 80 after step 76, which is shown in FIG. 6.

Figure 6:
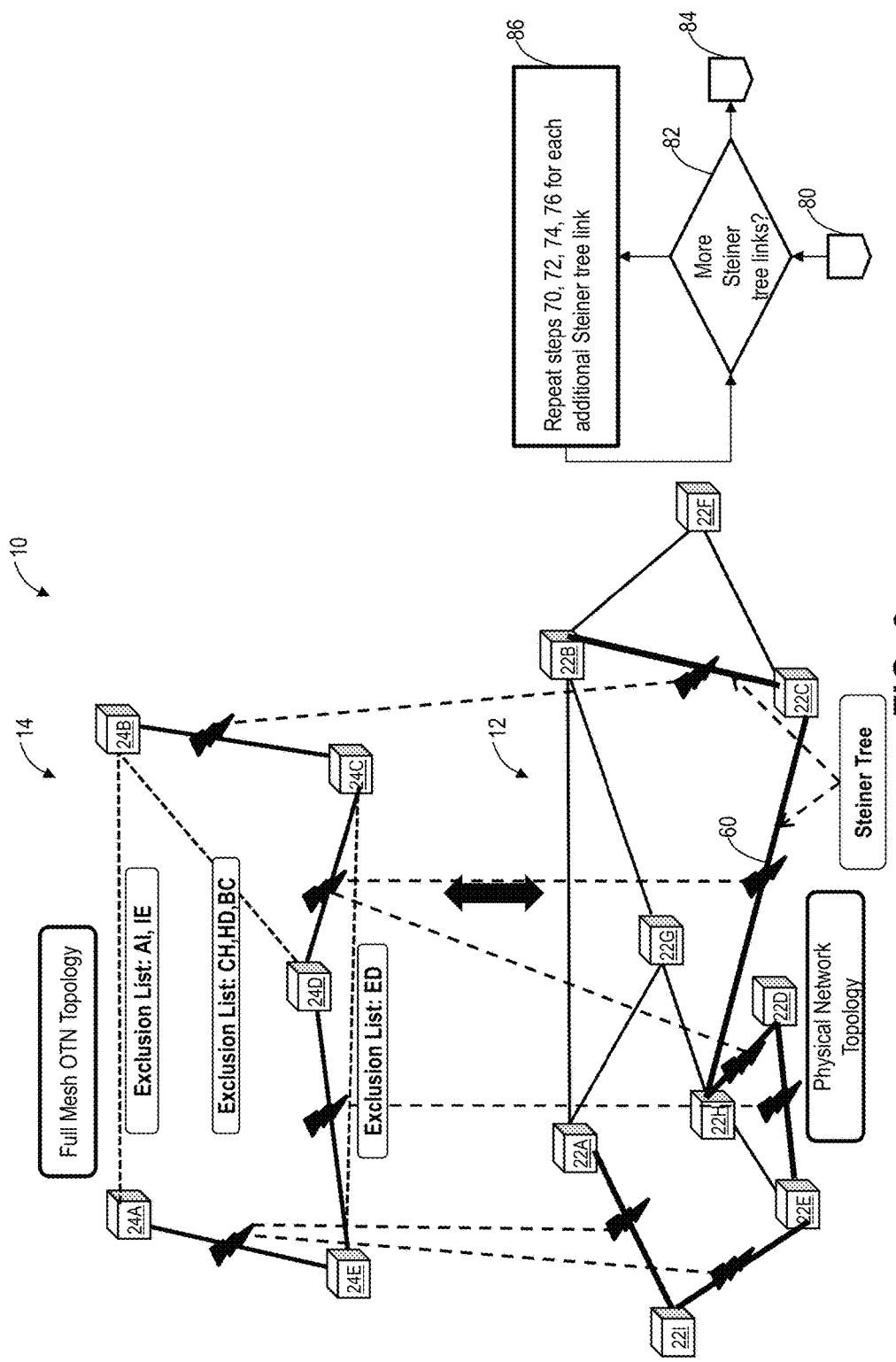
FIGS. 6 and 7 are network diagrams of the network from FIGS. 3 and 4 and flowcharts of the multi-layer resiliency process illustrating simulation of failures of links in a Steiner tree to determine correlation between client and server layers.
Figure 7:
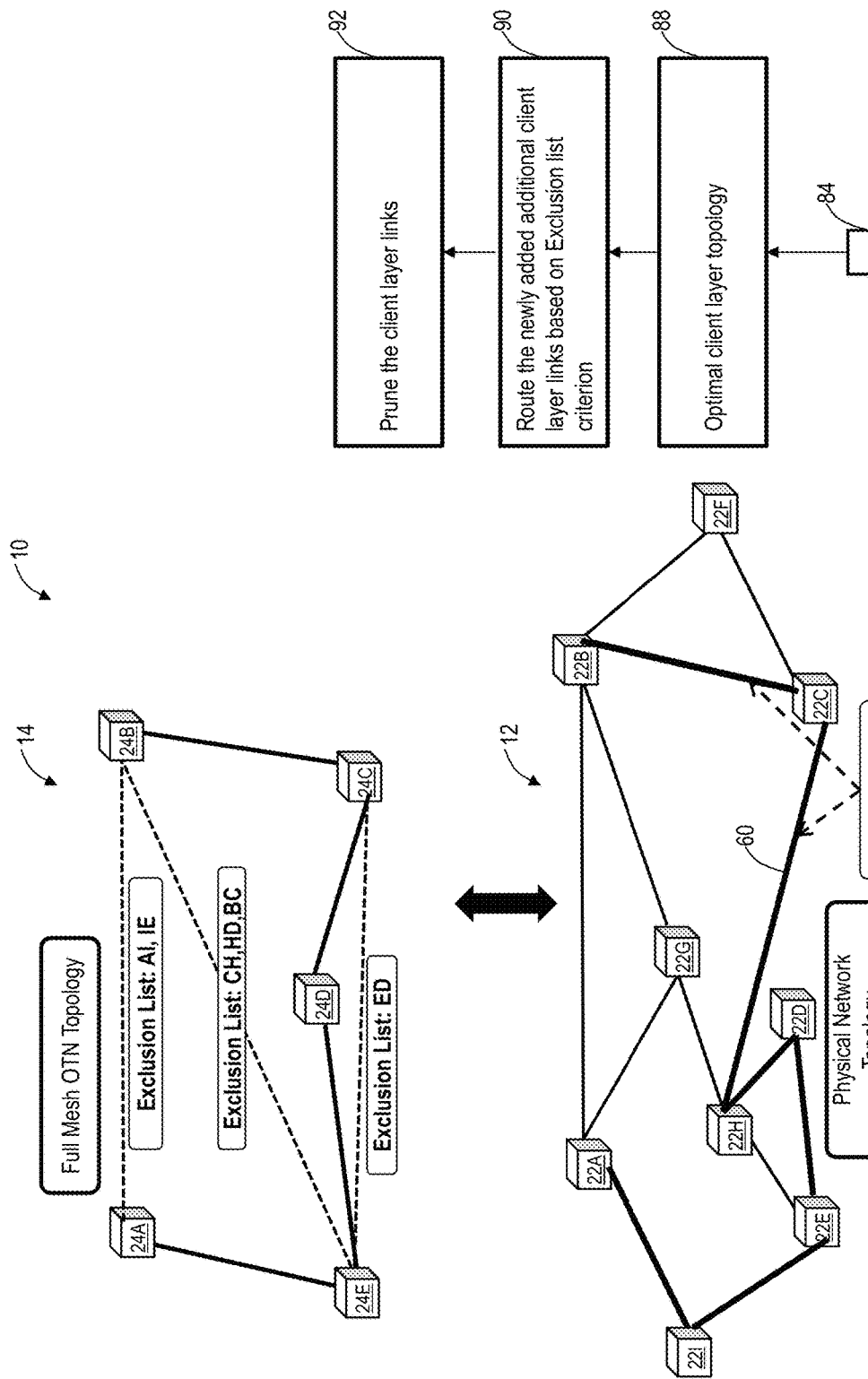
Figure 8:
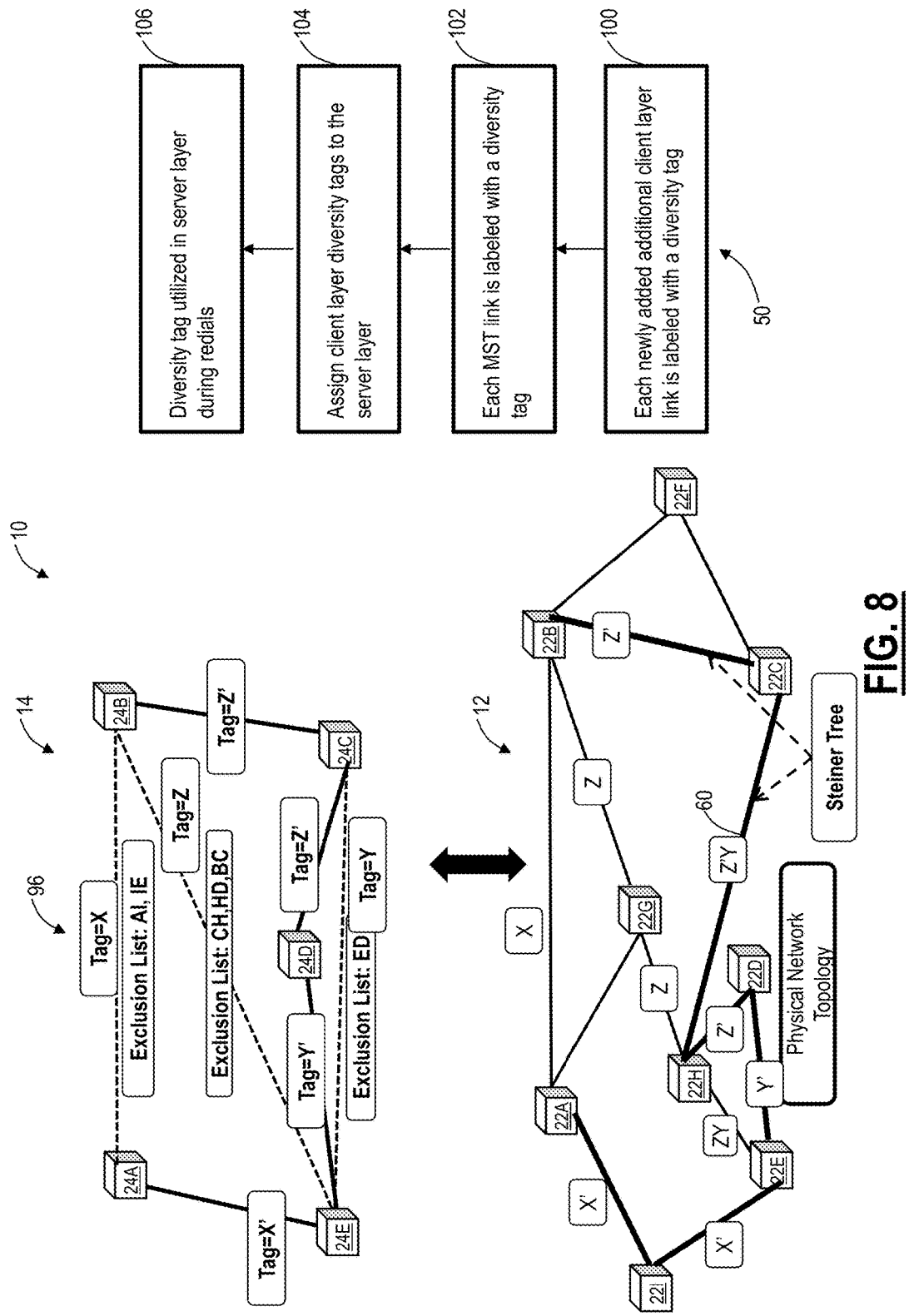
FIG. 8 is a network diagram of the network from FIGS. 3-7 and a flowchart of the multi-layer resiliency process illustrating use of diversity tags to provide resiliency between the client and server layers.

Next, in FIG. 6, the multi-layer resiliency process 50 checks if there are more Steiner tree links to simulate failures on (step 82), and if not, the multi-layer resiliency process 50 goes to FIG. 7 (step 84). In our example, in FIG. 6, there are more Steiner tree links to simulate failures, so the multi-layer resiliency process 50 repeats steps 70, 72, 74, 76 for each additional Steiner tree link (step 86). In FIG. 6, next, the Steiner tree link between the nodes 22D, 22H and the nodes 22H, 22C is simulated to fail, resulting in a failure in the MST 58 link between the switches 24C, 24D. The redundant MST includes an additional client layer link between the switches 24B, 24D. Next, the Steiner tree link between the nodes 22B, 22C is simulated to fail, resulting in a failure in the MST 58 link between the switches 24B, 24C, and no additional client layer links are required in the redundant MST. Finally, the Steiner tree link between the nodes 22A, 22I and the nodes 22I, 22E is simulated to fail, resulting in a failure in the MST 58 link between the switches 24A, 24E, and an additional client layer link between the switches 24A, 24B. The additional client layer link between the switches 24A, 24B has an exclusion list of the server layer links between the nodes 22A, 22I and 22I, 22E. The additional client layer link between the switches 24B, 24D has an exclusion list of the server layer links between the nodes 22C, 22H, the nodes 22H, 22D, and the nodes 22B, 22C. Again, these additional client layer links can be referred to as the resiliency paths.

Once all of the Steiner tree links are simulated to fail (step 84), in FIG. 7, the client layer 14, with the MST 58 and the redundant MST with associated additional client layer links added provides an optimal client layer 14 topology for single failure resiliency in the server layer 12 (step 88). Next, the multi-layer resiliency process 50 includes routing the newly added additional client layer links based on exclusion list criterion (step 90). That is, the additional client layer links are routed in the server layer 12, avoiding the exclusion list criterion. Finally, the phase 2 of the multi-layer resiliency process 50 includes pruning the client layer (step 92). Here, the additional client layer link between the switches 24B, 24D is removed, and another client layer link is added between the switches 24B, 24E. The multi-layer resiliency process 50 prunes the segment in the returned route which is already present in the MST 58 or the redundant MST in the client layer 14, i.e., if the route contains more than ($\geq 2$) vertices already part of the OTN tree, then prune the route. Step 92 of pruning means if the physical route (based on exclusion list criterion) for the redundant link (e.g., the link between the switches 24B, 24D) goes through a client layer link (e.g., between the switches 24E, 24D), which is already part of pre-existing client layer topology (OTN), then it can be pruned, to what does not overlap. Stated differently, to create a path from W to Z via a route, R (e.g., R=W-X-Y-Z), if a sub route, S (e.g., S=X-Y-Z) is already created [or visited, covered by existing, etc.], then the remaining sub routes only [(R minus S)], need to be added. i.e., only need to create the path from W-X, since X-Y-Z already exists. In another example, given W to Z via a route, R (R=W-X-Y-Z), and the sub route existing is X-Y, then only add two links W-X and Y-Z.

Multi-Layer Resiliency Process—Phase 3: Tag the Server Links for Diversity Routing/Redialing at Runtime The phase 3 of the multi-layer resiliency process 50 addresses diversity routing and redialing at runtime in the client layer 14. For phase 3 of the multi-layer resiliency process 50, a diversity tag is defined as an identifier (ID) which directs the client layer links to be best effort diverse of the server layer links carrying the same ID. First, each newly added additional client layer link is labeled with a diversity tag 96 (step 100). In this example, there are three additional client layer links, labeled X, Y, Z. Next, each of the MST 58 links is labeled with a diversity tag, labeled X', Y', Z' (step 102). Here, the MST 58 links are labeled based on whether they are part of the previously determined redundant MST or not. Here the X' diversity tag is a tag to an OTN link in the MST and X is the tag to the OTN link providing protection to its prime, X'. Here, as an example, two MST links, between the nodes 22D, 22C and the nodes 22B, 22C (tagged Z') are providing protection for the link between the nodes 22B, 22E (tagged Z).

Next, the diversity tags are assigned from the client layer 14 to the server layer 12 links (step 104). This basically includes information sharing between the layers 12, 14, and these diversity tags are used during redial activity in the server layer to achieve maximum diversity in the server layer (step 106). Specifically, the server layer 12 uses the diversity tags to maintain single cut resiliency in the client layer 14. The server layer 12 tagging includes assign Client (OTN) layer tag to each Server layer link in the route for Client (OTN) layer link. Some examples include, the client link between the switches 24A, 24B which has a tag X leads to a server link between the nodes 22A, 22B having a tag X as well. The client link between the switches 24B, 24E which has a tag Z leads to server links between the nodes 22B, 22G, the nodes 22G, 22H, and the nodes 22H, 22E having a tag Z as well. For the client link between the switches 24E, 24C that has a tag Y, the server link between the nodes 22E, 22H and the nodes 22H, 22C have a tag Y. Since the server link between the nodes 22E, 22H is common with the client links between the switches 24B, 24E and the switches 24E, 24C, it gets both Z and Y as tags, and similarly the server link between the nodes 22H, 22C is common with the client links between the switches 24C, 24D and the switches 24E, 24C, it gets both Z' and Y as tags. Now, once the tags are assigned correctly, they are used by the server layer 12 on a fiber cut in the server layer 12 the restoration will try to route maximally diverse of its Prime Tag. A reroute could take the link with the same tag though, but avoid one of its prime. Here maximally means best effort, since in some cases it may not be possible. Also maximally signifies that if there are two tags it has to honor both for best effort diversity. As an example, if the server link between the nodes 22G, 22H breaks, the client link between the switches 24B, 24E is rerouted from the server links between the nodes 22B, 22G, 22H, 22E to the server links between the nodes 22B, 22G, 22A, 22I, 22E or between the nodes 22B, 22A, 22I, 22E.

The following table summarizes the client layer 14 links (OTN) mapping onto the server layer 12 (DWDM) along with a latency summary:

| OTN | DWDM Route | Latency | Latency Delta from SPF (Shortest Path First) |
|---|---|---|---|
| 24A-24E | 22A-22I-22E | 9.885 | 0 |
| 24E-24D | 22E-22D | 12.647 | 0 |
| 24D-24C | 22D-22H-22C | 9.173 | 0 |
| 24C-24B | 22C-22B | 5.788 | 0 |
| 24E-24C | 22E-22H-22C | 14.98 | 0 |
| 24B-24D | 22B-22G-22H-22E | 19.159 | 0 |
| 24A-24B | 22A-22B | 16.4 | 0 |

Multi-Layer Resiliency Process—Ring+Star Example

Figure 9:
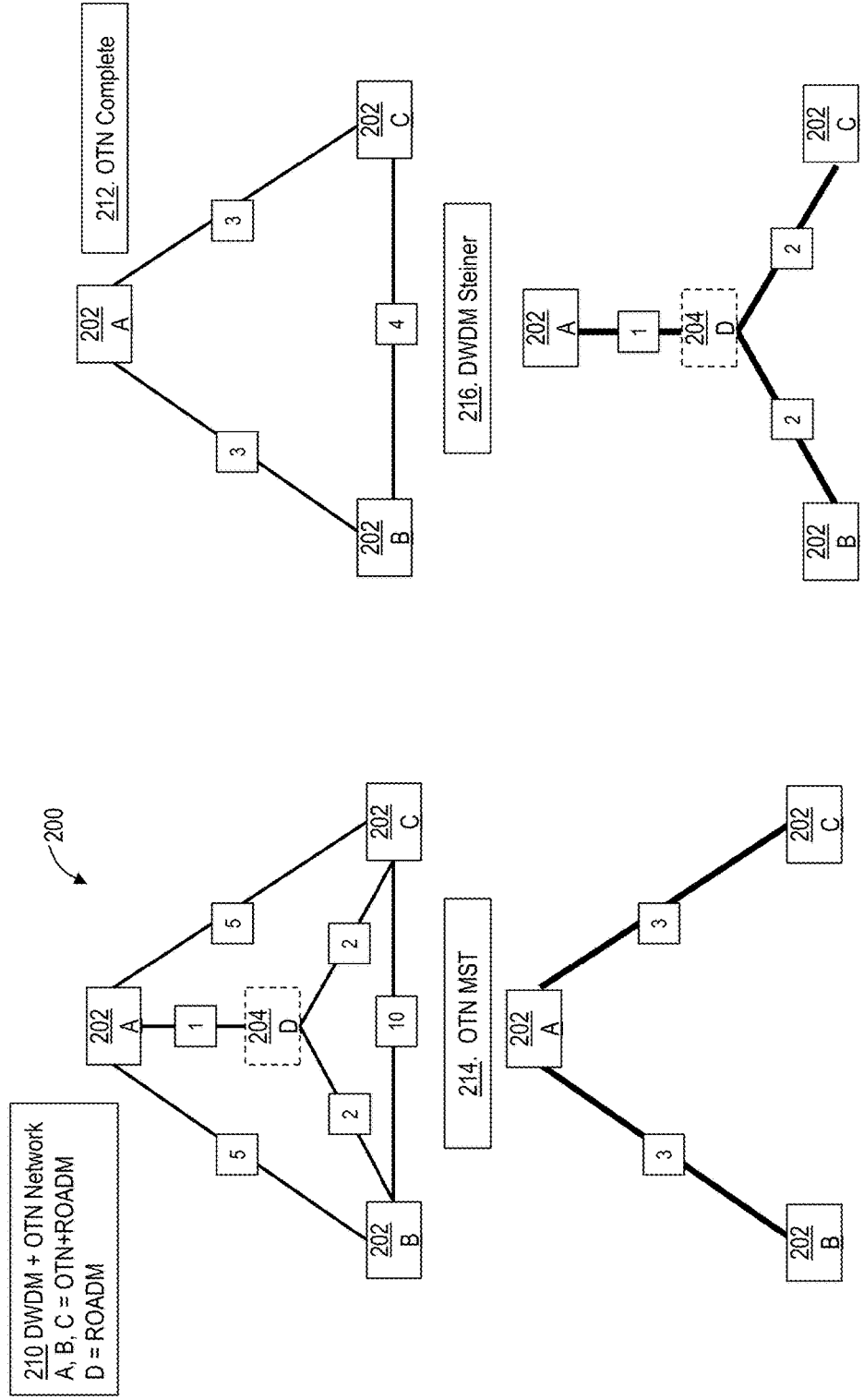
FIGS. 9 and 10 are network diagrams illustrate another exemplary operation of the multi-layer resiliency process on a star/ring network.
Figure 10:
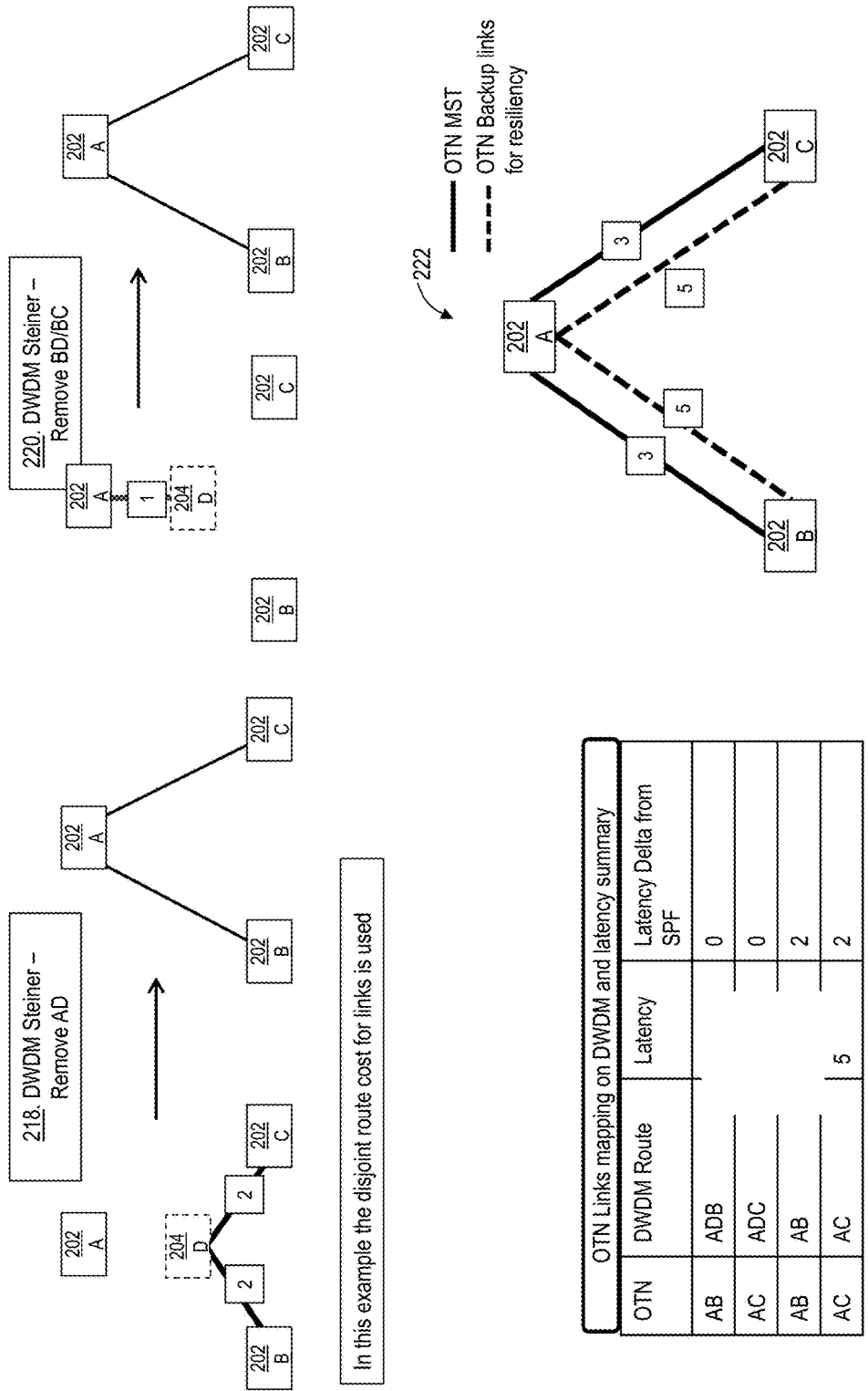

Referring to FIGS. 9 and 10, in an exemplary embodiment, network diagrams illustrate another exemplary operation of the multi-layer resiliency process 50 on a network 200. The network 200 is a ring and a star topology with three DWDM and OTN nodes 202A, 202B, 202C, and one DWDM only node 204D. Again, DWDM is the server layer 12 and OTN is the client layer. The nodes 202A, 202B, 202C include network elements configured to operate DWDM and OTN while the node 204D only operates DWDM. Additionally, at step 210, the network 200 is shown with both the OTN and DWDM layers along with latency (or another Figure of Merit) included on each DWDM link. At step 212, the OTN network is shown, separate from the DWDM network. Here, only the nodes 202A, 202B, 202C are shown in the OTN network. The corresponding links shown in step 212 are logical links which correspond to the DWDM links in step 210, routed with the lowest cost. For example, the nodes 202A, 202B are connected in the OTN network by the DWDM links between the nodes 202A, 204D, 202B, the nodes 202A, 202C are connected in the OTN network by the DWDM links between the nodes 202A, 204D, 202C, and the nodes 202B, 202C are connected in the OTN network by the DWDM links between the nodes 202B, 204D, 202C. That is, all OTN network links are through the node 204D in the DWDM network, based on routing costs.

In step 214, an OTN MST is shown, which eliminates the link between the nodes 202B, 202C since its cost is higher than the other links in the OTN network. In step 216, the DWDM network is shown with the Steiner tree computed. Here, the Steiner tree includes the node 204D at the center, connected to each of the nodes 202A, 202B, 202C. In FIG. 10, step 218, the Steiner tree links are failed (i.e., removed) to see the correlations. In step 218, the link between the nodes 202A, 204D are removed, leading to the addition of the additional OTN links between the nodes 202A, 202B and 202A, 202C. In step 220, the other two links of the Steiner tree are removed, but no new links are added to the redundant MST from the step 218.

Finally, in step 222, the final solution is shown with the OTN MST from the step 214 and OTN backup links for resiliency from the steps 216-220. Accordingly, with these two sets of links, the OTN network is resilient to any single fiber cut in the DWDM network.

Multi-Layer Resiliency Process—Actual Deployed Network Example

Figure 11:
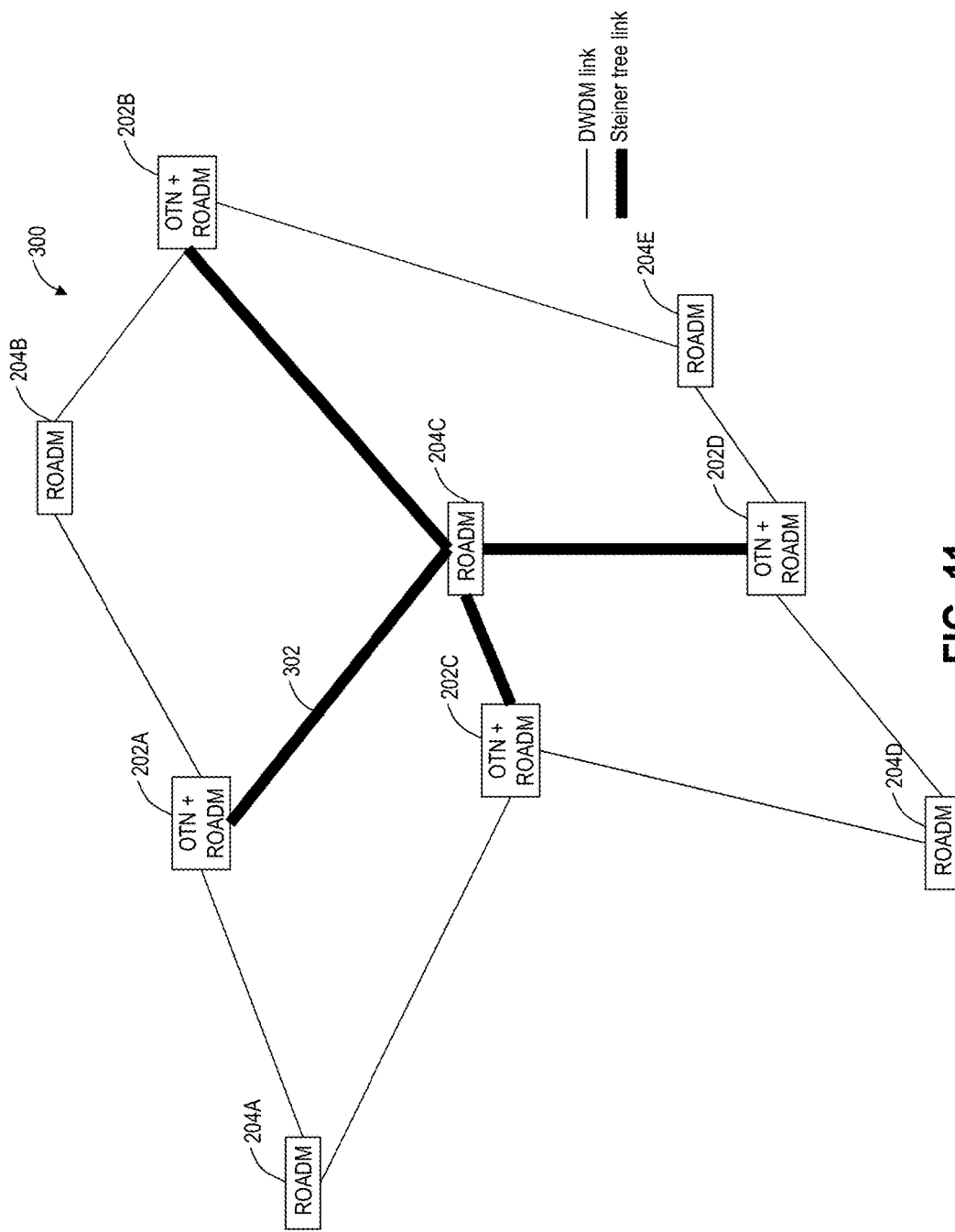
FIGS. 11 and 12 are network diagrams illustrate an exemplary operation of the multi-layer resiliency process on an actual customer network.
Figure 12:
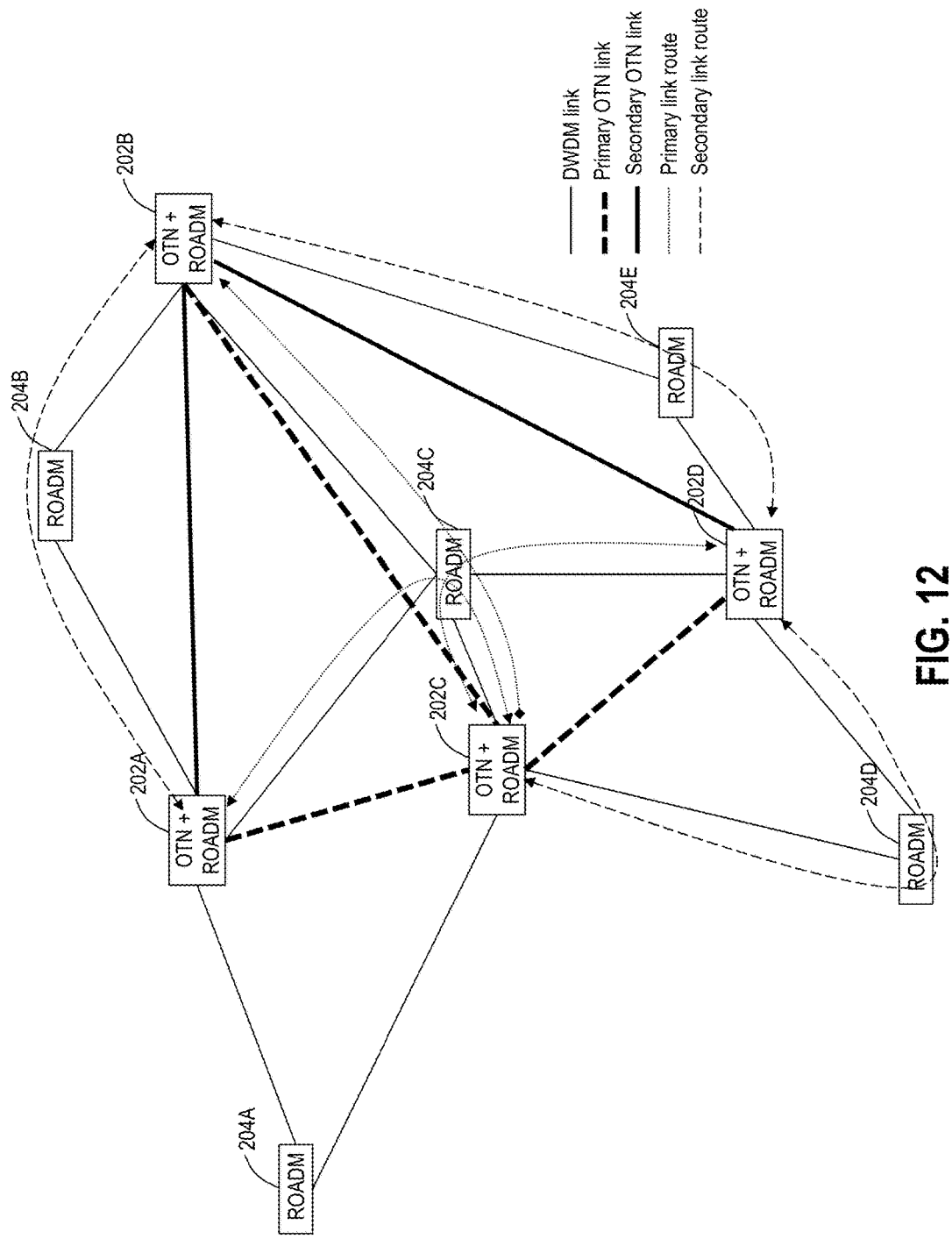

Referring to FIGS. 11 and 12, in an exemplary embodiment, network diagrams illustrate an exemplary operation of the multi-layer resiliency process 50 on an actual customer network 300. The network 300 includes nodes 202A-202D which are both DWDM and OTN and nodes 204A-204E which are DWDM only nodes, i.e., ROADM nodes. In FIG. 11, a Steiner tree 302 is shown in the DWDM layer, based on the MST in OTN layer. Specifically, FIG. 11 is the Steiner tree 302 in DWDM layer for a given topology, a hub and spoke embedded inside a ring. FIG. 12 illustrates the network 300, subsequent to the multi-layer resiliency process 50. Specifically, a client topology to survive single cut failure is shown. The primary OTN links indicate the OTN MST overlaid on the Steiner graph. The secondary OTN links indicate additional links to be installed in client layer to survive single cut resiliency in DWDM layer. The dashed lines indicate corresponding routes for the OTN links.

Exemplary Network Element/Node

Figure 13:
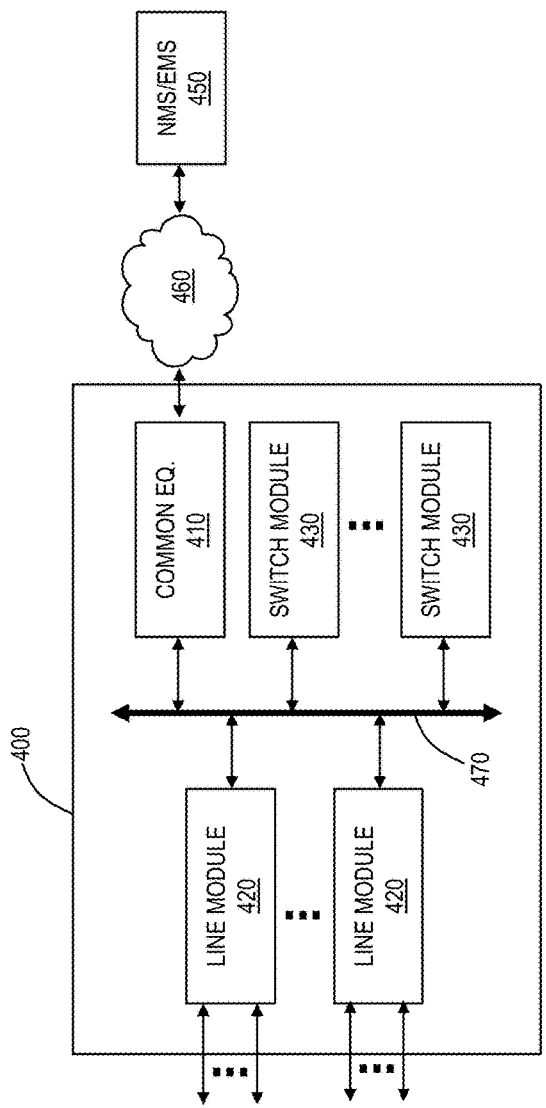
FIG. 13 is a block diagram of an exemplary node for use with the systems and methods described herein.

Referring to FIG. 13, in an exemplary embodiment, a block diagram illustrates an exemplary node 400 for use with the systems and methods described herein. In an exemplary embodiment, the exemplary node 400 can be a network element that may consolidate the functionality of a Multi-Service Provisioning Platform (MSPP), Digital Cross Connect (DCS), Ethernet and/or Optical Transport Network (OTN) switch, Wave Division Multiplexed (WDM)/Dense WDM (DWDM) platform, etc. into a single, high-capacity intelligent switching system providing Layer 0, 1, and/or 2 consolidation. In another exemplary embodiment, the node 400 can be any of an OTN Add/Drop Multiplexer (ADM), a Multi-Service Provisioning Platform (MSPP), a Digital Cross-Connect (DCS), an optical cross-connect, an optical switch, a router, a switch, a Wavelength Division Multiplexing (WDM) terminal, an access/aggregation device, etc. That is, the node 400 can be any digital system with ingress and egress digital signals and switching of channels, timeslots, tributary units, etc. While the node 400 is generally shown as an optical network element, the systems and methods contemplated for use with any switching fabric, network element, or network based thereon.

In an exemplary embodiment, the node 400 includes common equipment 410, one or more line modules 420, and one or more switch modules 430. The common equipment 410 can include power; a control module; operations, administration, maintenance, and provisioning (OAM&P)

access; user interface ports; and the like. The common equipment 410 can connect to a management system 450 through a data communication network 460 (as well as a Path Computation Element (PCE), Software Defined Network (SDN) controller, OpenFlow controller, etc.). The management system 450 can include a network management system (NMS), element management system (EMS), or the like. Additionally, the common equipment 410 can include a control plane processor, such as a controller 500 illustrated in FIG. 14 configured to operate the control plane as described herein. The node 400 can include an interface 470 for communicatively coupling the common equipment 410, the line modules 420, and the switch modules 430 to one another. For example, the interface 470 can be a backplane, midplane, a bus, optical or electrical connectors, or the like. The line modules 420 are configured to provide ingress and egress to the switch modules 430 and to external connections on the links to/from the node 400. In an exemplary embodiment, the line modules 420 can form ingress and egress switches with the switch modules 430 as center stage switches for a three-stage switch, e.g. a three-stage Clos switch. Other configurations and/or architectures are also contemplated. The line modules 420 can include optical transceivers, such as, for example, 1 Gb/s (GbE PHY), 2.5 GB/s (OC-48/STM-1, OTU1, ODU1), 10 Gb/s (OC-192/STM-64, OTU2, ODU2, 10 GbE PHY), 40 Gb/s (OC-768/STM-256, OTU3, ODU3, 40 GbE PHY), 100 Gb/s (OTU4, ODU4, 100 GbE PHY), ODUflex, Flexible Ethernet, etc.

Further, the line modules 420 can include a plurality of optical connections per module and each module may include a flexible rate support for any type of connection, such as, for example, 155 MB/s, 622 MB/s, 1 GB/s, 2.5 GB/s, 10 GB/s, 40 GB/s, and 100 GB/s, N x 1.25 GB/s, and any rate in between as well as future higher rates. The line modules 420 can include wavelength division multiplexing interfaces, short reach interfaces, and the like, and can connect to other line modules 420 on remote network elements, end clients, edge routers, and the like, e.g. forming connections on the links in the network 10. From a logical perspective, the line modules 420 provide ingress and egress ports to the node 400, and each line module 420 can include one or more physical ports. The switch modules 430 are configured to switch channels, timeslots, tributary units, packets, etc. between the line modules 420. For example, the switch modules 430 can provide wavelength granularity (Layer 0 switching); OTN granularity such as Optical Channel Data Unit-1 (ODU1), Optical Channel Data Unit-2 (ODU2), Optical Channel Data Unit-3 (ODU3), Optical Channel Data Unit-4 (ODU4), Optical Channel Data Unit-flex (ODUflex), Optical channel Payload Virtual Containers (OPVCs), ODTUGs, etc.; Ethernet granularity; and the like. Specifically, the switch modules 430 can include Time Division Multiplexed (TDM) (i.e., circuit switching) and/or packet switching engines. The switch modules 430 can include redundancy as well, such as 1:1, 1:N, etc. In an exemplary embodiment, the switch modules 430 provide OTN switching and/or Ethernet switching.

Those of ordinary skill in the art will recognize the node 400 can include other components which are omitted for illustration purposes, and that the systems and methods described herein are contemplated for use with a plurality of different network elements with the node 400 presented as an exemplary type of network element. For example, in another exemplary embodiment, the node 400 may not include the switch modules 430, but rather have the corresponding functionality in the line modules 420 (or some equivalent) in a distributed fashion. For the node 400, other architectures providing ingress, egress, and switching are also contemplated for the systems and methods described herein. In general, the systems and methods described herein contemplate use with any network element providing switching of channels, timeslots, tributary units, wavelengths, etc. and using the control plane. Furthermore, the node 400 is merely presented as one exemplary node 400 for the systems and methods described herein.

Exemplary Controller

Figure 14:
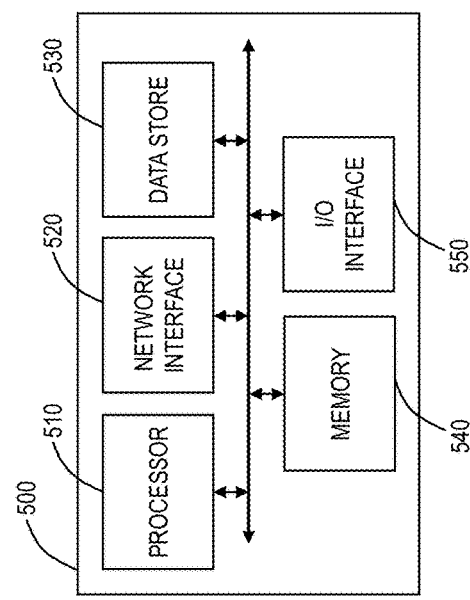
FIG. 14 is a block diagram illustrates a controller to provide control plane processing and/or operations, administration, maintenance, and provisioning (OAM&P) for the node, and/or to implement a Software Defined Networking (SDN) controller.

Referring to FIG. 14, in an exemplary embodiment, a block diagram illustrates a controller 500 to provide control plane processing and/or operations, administration, maintenance, and provisioning (OAM&P) for the node 400, and/or to implement a Software Defined Networking (SDN) controller. The controller 500 can be part of the common equipment, such as common equipment 410 in the node 400, or a stand-alone device communicatively coupled to the node 400 via the DCN 460. In a stand-alone configuration, the controller 500 can be an SDN controller, an NMS, a PCE, etc. The controller 500 can include a processor 510 which is a hardware device for executing software instructions such as operating the control plane. The processor 510 can be any custom made or commercially available processor, a central processing unit (CPU), an auxiliary processor among several processors associated with the controller 500, a semiconductor-based microprocessor (in the form of a microchip or chip set), or generally any device for executing software instructions. When the controller 500 is in operation, the processor 510 is configured to execute software stored within memory, to communicate data to and from the memory, and to generally control operations of the controller 500 pursuant to the software instructions. The controller 500 can also include a network interface 520, a data store 530, memory 540, an I/O interface 550, and the like, all of which are communicatively coupled to one another and with the processor 510.

The network interface 520 can be used to enable the controller 500 to communicate on the DCN 460, such as to communicate control plane information to other controllers, to the management system 450, to the nodes 400, and the like. The network interface 520 can include, for example, an Ethernet card (e.g., 10BaseT, Fast Ethernet, Gigabit Ethernet) or a wireless local area network (WLAN) card (e.g., 802.11). The network interface 520 can include address, control, and/or data connections to enable appropriate communications on the network. The data store 530 can be used to store data, such as control plane information, provisioning data, OAM&P data, etc. The data store 530 can include any of volatile memory elements (e.g., random access memory (RAM, such as DRAM, SRAM, SDRAM, and the like)), nonvolatile memory elements (e.g., ROM, hard drive, flash drive, CDROM, and the like), and combinations thereof. Moreover, the data store 530 can incorporate electronic, magnetic, optical, and/or other types of storage media. The memory 540 can include any of volatile memory elements (e.g., random access memory (RAM, such as DRAM, SRAM, SDRAM, etc.)), nonvolatile memory elements (e.g., ROM, hard drive, flash drive, CDROM, etc.), and combinations thereof. Moreover, the memory 540 may incorporate electronic, magnetic, optical, and/or other types of storage media. Note that the memory 540 can have a distributed architecture, where various components are situated remotely from one another, but may be accessed by the processor 510. The I/O interface 550 includes components for the controller 500 to communicate with other devices. Further, the I/O interface 550 includes components for the controller 500 to communicate with the other nodes, such as using overhead associated with OTN signals.

In an exemplary embodiment, the controller 500 is configured to communicate with other controllers 500 in the network 10 to operate the control plane for control plane signaling. This communication may be either in-band or out-of-band. For SONET networks and similarly for SDH networks, the controllers 500 may use standard or extended SONET line (or section) overhead for in-band signaling, such as the Data Communications Channels (DCC). Out-of-band signaling may use an overlaid Internet Protocol (IP) network such as, for example, User Datagram Protocol (UDP) over IP. In an exemplary embodiment, the controllers 500 can include an in-band signaling mechanism utilizing OTN overhead. The General Communication Channels (GCC) defined by ITU-T Recommendation G.709 are in-band side channels used to carry transmission management and signaling information within Optical Transport Network elements. The GCC channels include GCC0 and GCC1/2. GCC0 are two bytes within Optical Channel Transport Unit-k (OTUk) overhead that are terminated at every 3R (Re-shaping, Re-timing, Re-amplification) point. GCC1/2 are four bytes (i.e. each of GCC1 and GCC2 include two bytes) within Optical Channel Data Unit-k (ODUk) overhead. For example, GCC0, GCC1, GCC2 or GCC1+2 may be used for in-band signaling or routing to carry control plane traffic. Based on the intermediate equipment's termination layer, different bytes may be used to carry control plane signaling. If the ODU layer has faults, it has been ensured not to disrupt the GCC1 and GCC2 overhead bytes and thus achieving the proper delivery control plane signaling. Other mechanisms are also contemplated for control plane signaling.

The controller 500 is configured to operate the control plane 16 in the network 10. That is, the controller 500 is configured to implement software, processes, algorithms, etc. that control configurable features of the network 10, such as automating discovery of the nodes, capacity on the links, port availability on the nodes, connectivity between ports; dissemination of topology and bandwidth information between the nodes; path computation and creation for connections; network level protection and restoration; and the like. As part of these functions, the controller 500 can include a topology database that maintains the current topology of the network based on control plane signaling (e.g., HELLO messages) and a connection database that maintains available bandwidth on the links again based on the control plane signaling. Again, the control plane is a distributed control plane; thus a plurality of the controllers 500 can act together to operate the control plane using the control plane signaling to maintain database synchronization. In source-based routing, the controller 500 at a source node for a connection is responsible for path computation and establishing by signaling other controllers 500 in the network 10, such as through the SETUP message 20 which can include preemption. For example, the source node and its controller 500 can signal a path through various techniques such as Resource Reservation Protocol-Traffic Engineering (RSVP-TE) (G.7713.2), Private Network-to-Network Interface (PNNI), Constraint-based Routing Label Distribution Protocol (CR-LDP), etc. and the path can be signaled as a Designated Transit List (DTL) in PNNI or an Explicit Route Object (ERO) in RSVP-TE/CR-LDP. As described herein, the connection refers to a signaled, end-to-end connection such as an SNC, SNCP, LSP, etc. which are generally a service. Path computation generally includes determining a path, i.e. traversing the links through the nodes from the originating node to the destination node based on a plurality of constraints such as administrative weights on the links, bandwidth availability on the links, etc. One aspect of path computation is preemption for a higher priority service.

It will be appreciated that some exemplary embodiments described herein may include one or more generic or specialized processors ("one or more processors") such as microprocessors, digital signal processors, customized processors, and field programmable gate arrays (FPGAs) and unique stored program instructions (including both software and firmware) that control the one or more processors to implement, in conjunction with certain non-processor circuits, some, most, or all of the functions of the methods and/or systems described herein. Alternatively, some or all functions may be implemented by a state machine that has no stored program instructions, or in one or more application specific integrated circuits (ASICs), in which each function or some combinations of certain of the functions are implemented as custom logic. Of course, a combination of the aforementioned approaches may be used. Moreover, some exemplary embodiments may be implemented as a non-transitory computer-readable storage medium having computer readable code stored thereon for programming a computer, server, appliance, device, etc. each of which may include a processor to perform methods as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor that, in response to such execution, cause a processor or any other circuitry to perform a set of operations, steps, methods, processes, algorithms, etc.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A method of path computation of a service in a multi-layer network comprising a client layer and a server layer, the method comprising:
   determining correlations between the client layer and the server layer;
   assigning data to one of client layer links and server layer links based on diversity between one another responsive to the determined correlations, wherein the diversity is determined first as completely disjoint, and if there is no resiliency path which is completely disjoint, the diversity is determined with a least amount of overlap; and
   determining and provisioning a resiliency path for a service from a current path using the data to determine maximum diversity between the resiliency path and the current path in the client layer and the server layer.

2. The method of claim 1, wherein the data comprises exclusion rules for resiliency paths which define which of the client layer links and the server layer links are not disjoint.

3. The method of claim 1, wherein the data comprises tags assigned from the client layer to the server layer which are used in the determining the resiliency path in the server layer.

4. The method of claim 1, wherein the determining the resiliency path is responsive to a failure on the current path.

5. The method of claim 1, wherein the determining correlations utilizes a minimal spanning tree in the client layer and a Steiner tree in the server layer.

6. The method of claim 1, wherein the server layer is an optical layer and the client layer is a Time Division Multiplexing layer.

7. A controller configured to perform path computation of a service in a multi-layer network comprising a client layer and a server layer, the controller comprising:
- a processor; and
- memory storing instructions that, when executed, cause the processor to
    - determine correlations between the client layer and the server layer,
    - assign data to one of client layer links and server layer links based on diversity between one another responsive to the determined correlations, wherein the diversity is determined first as completely disjoint, and if there is no resiliency path which is completely disjoint, the diversity is determined with a least amount of overlap, and
    - determine and cause provisioning of a resiliency path for a service from a current path using the data to determine maximum diversity between the resiliency path and the current path in the client layer and the server layer.

8. The controller of claim 7, wherein the data comprises exclusion rules for resiliency paths which define which of the client layer links and the server layer links are not disjoint.

9. The controller of claim 7, wherein the data comprises tags assigned from the client layer to the server layer which are used wherein the resiliency path is determined in the server layer.

10. The controller of claim 7, wherein the resiliency path is determined responsive to a failure on the current path.

11. The controller of claim 7, wherein the correlations are determined using a minimal spanning tree in the client layer and a Steiner tree in the server layer.

12. The controller of claim 7, wherein the server layer is an optical layer and the client layer is a Time Division Multiplexing layer.

13. An apparatus configured to perform path computation of a service in a multi-layer network comprising a client layer and a server layer, the controller comprising:
- circuitry configured to determine correlations between the client layer and the server layer;
- circuitry configured to assign data to one of client layer links and server layer links based on diversity between one another responsive to the determined correlations, wherein the diversity is determined first as completely disjoint, and if there is no resiliency path which is completely disjoint, the diversity is determined with a least amount of overlap; and
- circuitry configured to determine and cause provisioning of a resiliency path for a service from a current path using the data to determine maximum diversity between the resiliency path and the current path in the client layer and the server layer.

14. The apparatus of claim 13, wherein the data comprises exclusion rules for resiliency paths which define which of the client layer links and the server layer links are not disjoint.

15. The apparatus of claim 13, wherein the data comprises tags assigned from the client layer to the server layer which are used wherein the resiliency path is determined in the server layer.

16. The apparatus of claim 13, wherein the resiliency path is determined responsive to a failure on the current path.

17. The apparatus of claim 13, wherein the correlations are determined using a minimal spanning tree in the client layer and a Steiner tree in the server layer.

* * * * *